(12) United States Patent
Hendren et al.

(10) Patent No.: US 9,975,466 B2
(45) Date of Patent: May 22, 2018

(54) TIE DOWN CLEAT

(71) Applicant: Dura Operating, LLC, Auburn Hills, MI (US)

(72) Inventors: Robert A. Hendren, Macomb, MI (US); Alex M. Langreet, Mount Clemens, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 70 days.

(21) Appl. No.: 15/275,879

(22) Filed: Sep. 26, 2016

(65) Prior Publication Data

US 2017/0088033 A1 Mar. 30, 2017

Related U.S. Application Data

(60) Provisional application No. 62/222,852, filed on Sep. 24, 2015.

(51) Int. Cl.
*B60P 7/08* (2006.01)

(52) U.S. Cl.
CPC .................. *B60P 7/0807* (2013.01)

(58) Field of Classification Search
CPC ..... B60P 7/0807; B60P 7/0823; B60P 7/0815; B60P 3/07; B60P 3/40; B60P 7/06; B60P 7/0876; B60P 7/0892

USPC ....... 410/104, 105, 101, 102, 106, 100, 107, 410/113, 118, 81, 84, 90, 77; 248/499, 248/500, 503, 424, 429, 692

See application file for complete search history.

(56) References Cited

U.S. PATENT DOCUMENTS

| 5,044,856 | A * | 9/1991 | Jerabek | F16B 21/02 411/349 |
|---|---|---|---|---|
| 5,209,619 | A * | 5/1993 | Rinderer | F16B 37/045 411/553 |
| 6,827,531 | B2 * | 12/2004 | Womack | B61D 45/001 410/104 |
| 7,175,377 | B2 * | 2/2007 | Womack | B60P 7/0815 410/104 |
| 8,408,853 | B2 | 4/2013 | Womack et al. | |
| 2003/0156919 | A1 * | 8/2003 | Schwarz | F16B 37/045 411/349 |
| 2005/0036848 | A1 * | 2/2005 | Cunningham | B60P 7/0815 410/104 |

* cited by examiner

*Primary Examiner* — D Glenn Dayoan
*Assistant Examiner* — Sunsurraye Westbrook
(74) *Attorney, Agent, or Firm* — Reising Ethington P.C.; Matthew J. Schmidt; Robert E. Ford

(57) ABSTRACT

A tie-down cleat includes a body having at least one stop surface and a wall with an opening, and a fastener assembly having a first retainer extending through the opening and having a head, and a second retainer operable to actuate the first retainer. The first retainer is rotatable relative to the body and includes a stop surface oriented to selectively engage the stop surface of the body to limit rotation of the first retainer relative to the body.

20 Claims, 5 Drawing Sheets

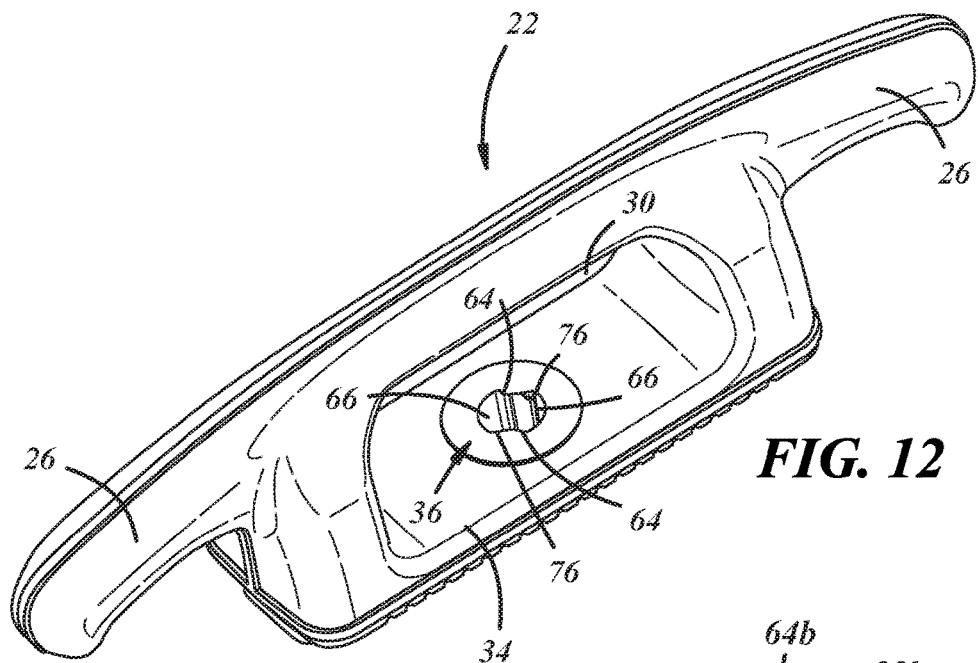
FIG. 12
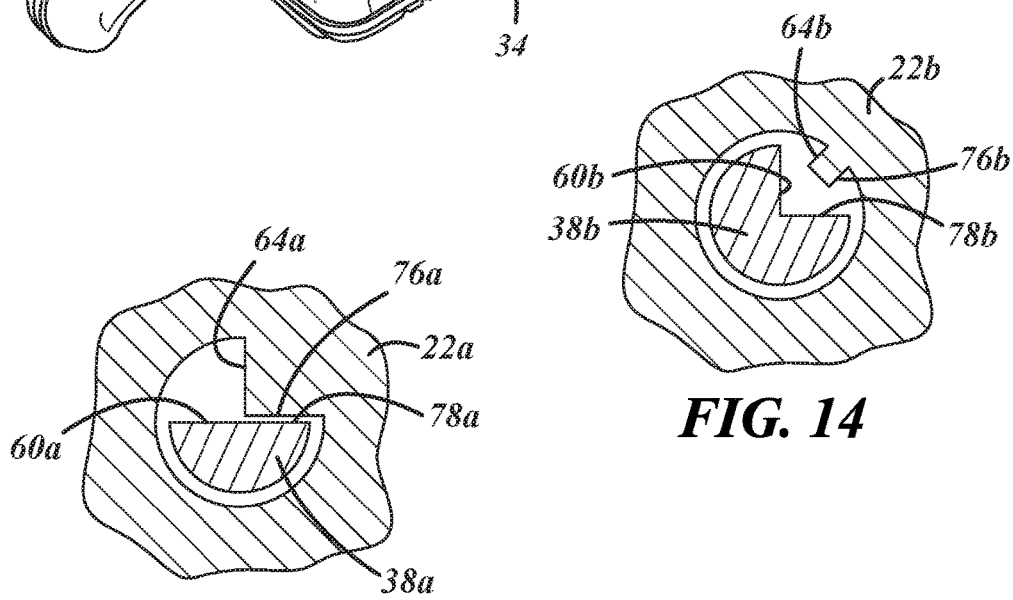
FIG. 13
FIG. 14
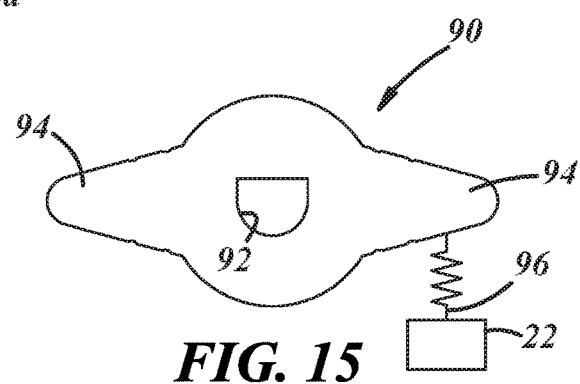
FIG. 15

TIE DOWN CLEAT

REFERENCE TO COPENDING APPLICATIONS

This application claims the benefit of U.S. Provisional Patent Application Ser. No. 62/222,852 filed Sep. 24, 2015, which is incorporated herein by reference in its entirety.

TECHNICAL FIELD

The present disclosure relates to a device for securing loads to a track such as may be mounted in or near a truck bed.

BACKGROUND

Cleats of various design have been used to secure loads in the bed of a vehicle, but the cleats have proven to be difficult to reliably and easily secure within the bed. Some cleats require the entire body of the cleat to be rotated relative to the vehicle bed which requires clearance sufficient for rotation of the cleat body and thereby limits the space in which the cleat can be used.

SUMMARY

A tie-down cleat includes a body having at least one stop surface and a wall with an opening, and a fastener assembly having a first retainer extending through the opening and having a head, and a second retainer operable to actuate the first retainer. The first retainer is rotatable relative to the body and includes a stop surface oriented to selectively engage the stop surface of the body to limit rotation of the first retainer relative to the body.

At least some implementations of the tie down cleat disclosed herein may include one or more of the features noted hereafter. The stop surfaces may be arranged so that the first retainer can rotate at least eighty (80) degrees relative to the body. The body may have a length and a width that is less than the length, and the first retainer may have a head with a length and a width that is less than the length of the head, and the stop surface of the first retainer may engage the stop surface of the body when the head is oriented so that the length of the head is perpendicular to the length of the body or rotated within ten (10) degrees of being perpendicular. The body may include a limit surface and the first retainer includes a limit surface adapted to engage the limit surface of the body to limit rotation of the first retainer relative to the body, and the stop surface of the first retainer may engage the stop surface of the body when the first retainer is rotated in a first direction and the limit surface of the first retainer may engage the limit surface of the body when the first retainer is rotated in a second direction. Some implementations may include a rotation element that is coupled to the first retainer for rotation therewith, and some implementations may include a biasing member coupled to the rotation element to yieldably bias the rotation element for rotation in one direction.

In at least some implementations, the second retainer is frictionally engaged with the first retainer so that rotation of the second retainer tends to cause rotation of the second retainer. In at least some implementations, the first retainer includes a lobe that extends radially outwardly from an adjacent portion of the first retainer, and the lobe defines at least part of the stop surface of the first retainer. In at least some implementations, the stop surface of the body is defined at least partially within the opening, and the limit surface of the body may be defined at least partially within the opening. The body may include an inwardly extending portion that protrudes into the opening and defines a non-circular portion of the opening, and the stop surface may be defined by the inwardly extending portion.

Other embodiments can be derived from combinations of the above and those from the embodiments shown in the drawings and the descriptions that follow. Further, within the scope of this application it is envisaged that the various aspects, embodiments, examples, features and alternatives set forth in the preceding paragraphs, in the claims and/or in the following description and drawings may be taken independently or in any combination thereof. For example, features disclosed in connection with one embodiment are applicable to all embodiments, except where there is incompatibility of features.

BRIEF DESCRIPTION OF THE DRAWINGS

The following detailed description of preferred implementations and best mode will be set forth with regard to the accompanying drawings, in which:

FIG. 12 is a perspective view of the cleat body without the fastener assembly;

FIG. 13 is a fragmentary sectional view of a bolt shank in an opening;

FIG. 14 is a fragmentary sectional view of a bolt shank in an opening; and

FIG. 15 is a plan view of a rotation component of the fastener assembly.

DETAILED DESCRIPTION

Figure 1:
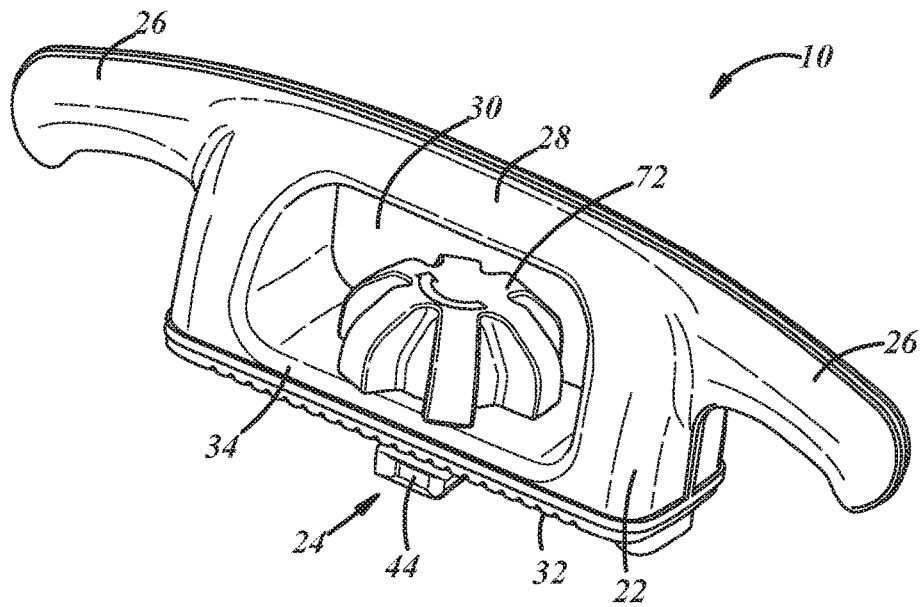
FIG. 1 is perspective view of a tie down cleat.
Figure 2:
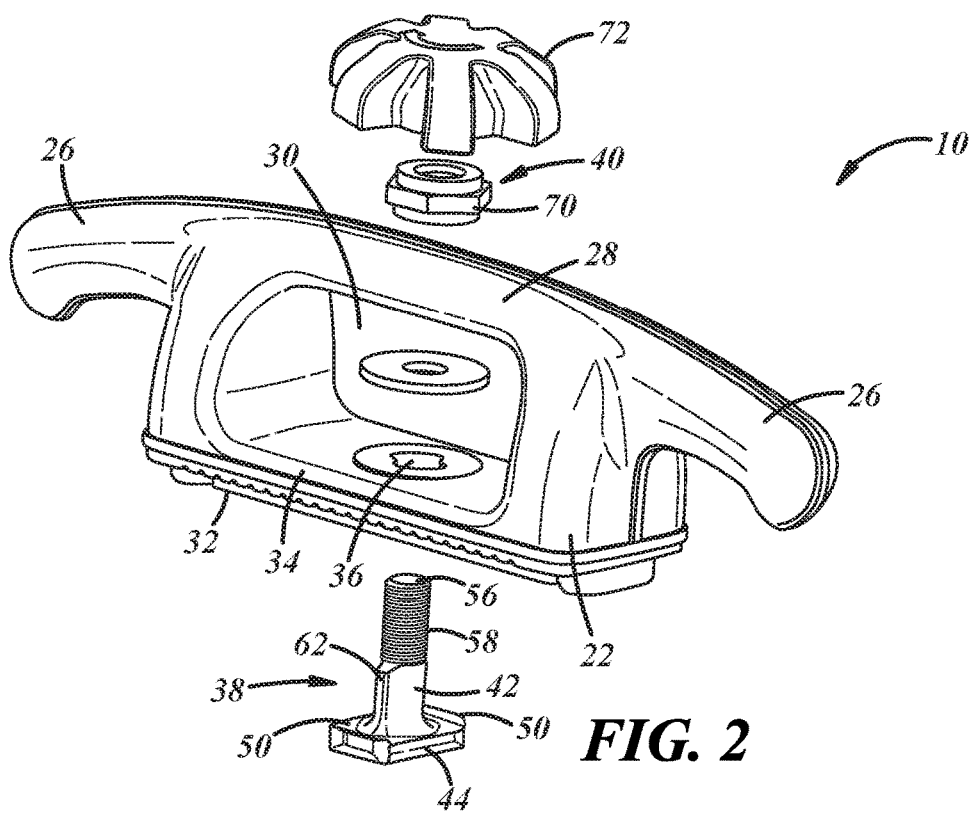
FIG. 2 is an exploded perspective view of the tie down cleat showing its main body and fastener assembly.
Figure 3:
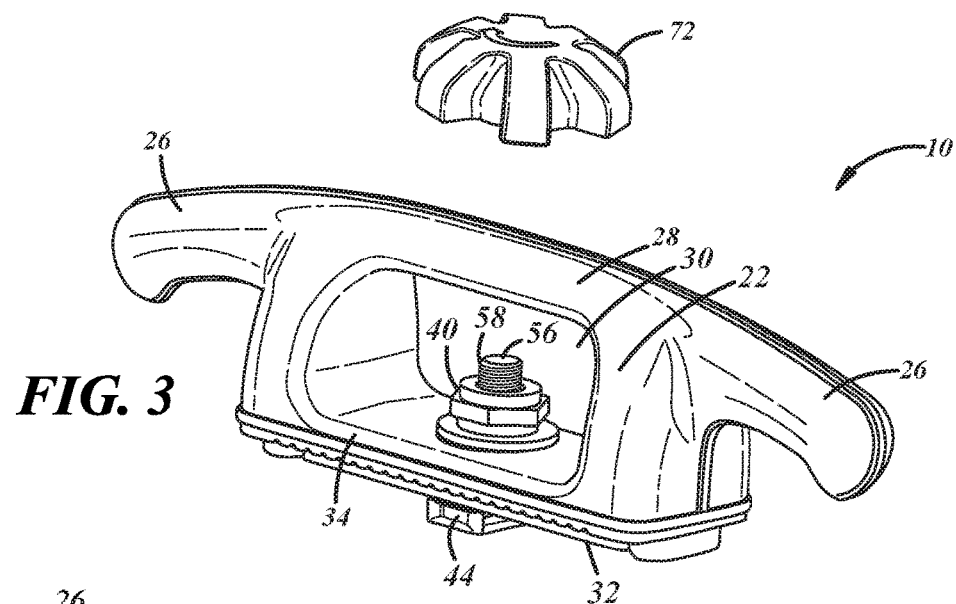
FIG. 3 is a partially exploded perspective view of a tie down cleat with a thumb wheel shown removed from a nut of the fastener assembly.
Figure 4:
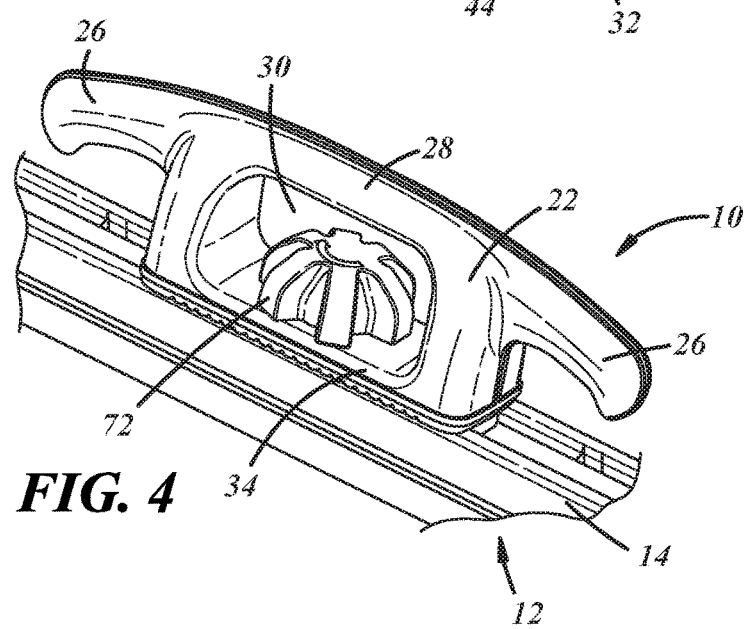
FIG. 4 is a perspective view showing the cleat installed on a track.
Figure 5:
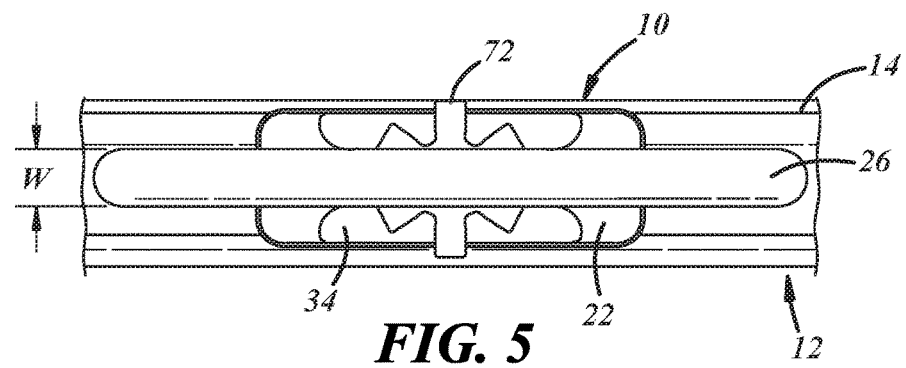
FIG. 5 is a plan view of the cleat installed on a track.
Figure 6:
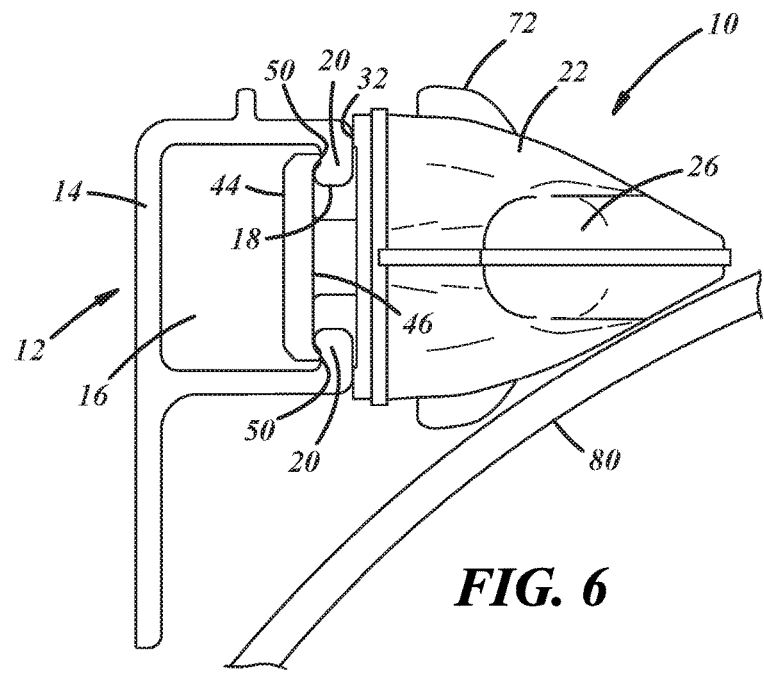
FIG. 6 is an end view of the cleat installed on a track and illustrating a nearby component providing limited clearance or a swing path of a nearby door.

Referring in more detail to the drawings, FIGS. 1-3 illustrate a tie down cleat 10 that may be secured to a track 12, as shown in FIGS. 4-6, to facilitate retaining cargo placed in, for example, the bed of a truck or another cargo area of a vehicle. The track 12 may be defined by an extruded body 14 having an inner channel 16 defined at least in part by a slot 18 that is defined between opposed and inwardly extending walls 20 (see e.g. FIG. 6). The cleat 10 includes a body 22 and a fastener assembly 24 and may be releasably and removably secured to the track 12 so that the cleat 10 may be conveniently located in different positions along the track 12. And with tracks positioned in different places within the truck bed, cleats 10 may be provided at various locations within the truck bed to facilitate securing cargo within the vehicle cargo area.

Figure 7:
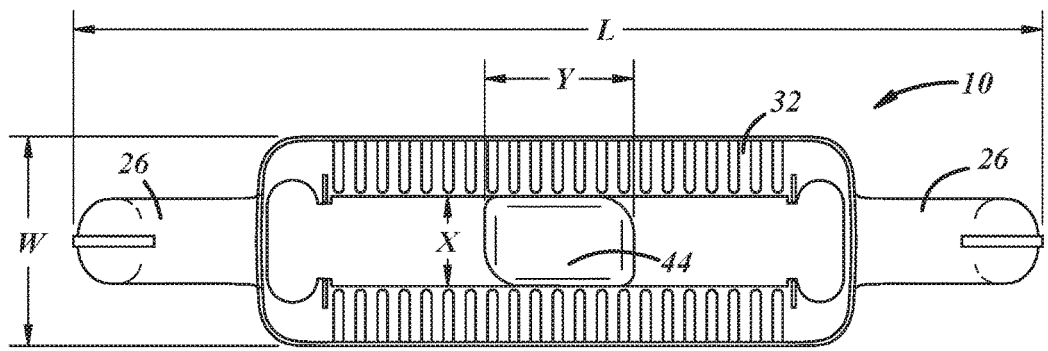
FIG. 7 is a bottom view of the cleat showing the fastener assembly in a first position with a retainer head generally parallel to the cleat body.

The cleat body 22 may be formed in one-piece or multiple pieces that are joined or connected together, and may include one or more projections 26 or openings to receive a strap or rope used to tie down or secure cargo. To facilitate handling and installing the cleat 10, the body 22 may also include a handle 28 which may be defined at least in part by a cavity 30. In at least some implementations, the body 22 has a width W that is less than a length L (FIG. 7). A bottom surface 32 of the body 22 may be generally planar and adapted to be received adjacent to the track walls 20 to which the cleat 10 is secured in use. The cavity may be separated from the bottom surface 32 by a base wall 34 that defines part of the cavity 30 on one side and the bottom surface 32 on the other side. To receive the fastener assembly 24, an opening 36 (FIGS. 2, 8, 10 and 12) extends through the base wall 34. The body 22 may be formed of any material suitable for the intended environment (often exposed to the elements—hot, cold, rain, snow, etc) and to bear intended loads. In at least some implementations, the body 22 is formed from a metal, with aluminum being one example, although plastic and composite bodies may be used if desired.

Figure 11:
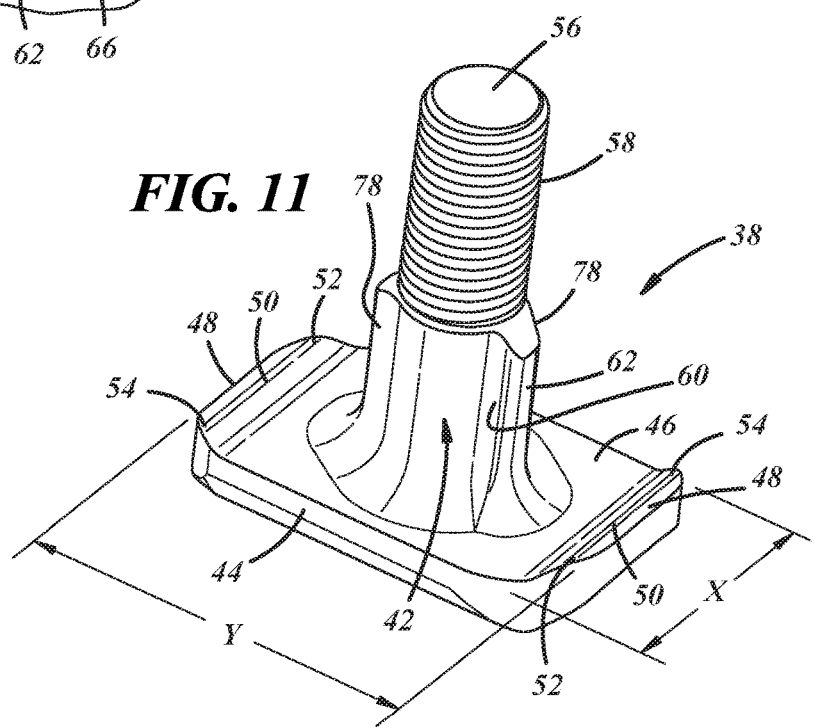
FIG. 11 is a perspective view of a retainer of the fastener assembly.

The fastener assembly 24 includes a first retainer 38 and a second retainer 40 releasably connected to the first retainer 38. In at least some implementations the first retainer is a bolt 38 (as shown in FIGS. 2 and 11) and the second retainer is a nut 40 (as shown in FIGS. 2 and 3). For ease of further description, these terms will be used but without any intent to limit the first and second retainer to only a bolt 38 and nut 40.

The bolt 38 has a shank 42 and an enlarged head 44 extending from the shank 42. As shown in FIG. 11, the head 44 has a first dimension X (e.g. a width) that is less than the width W (FIG. 5) of the track slot 18 in which it will be installed and a second dimension Y (e.g. a length) greater than the width W of the track slot 18. In this way, the head 44 is adapted to be received through the track slot 18 in a first orientation or position and then moved (e.g. rotated) to a second orientation or position to overlap the walls 20 of the track 12 and inhibit or prevent removal of the bolt 38 from the track 12. In the example shown in the drawings, the head 44 is generally rectangular although other shapes may be used. The head 44 has a inner surface 46 that faces and at least a part of which engages the track walls 20 in an installed position of the cleat 10. The inner surface 46 may include one or more flanges 48 extending outwardly from (e.g. raised relative to) the remainder of the inner surface 46 and adapted to provide a reduced area of engagement with the track 12 to increase a pressure applied to the track 12 and ensure firm engagement between the head 44 and track 12 in the installed position of the cleat 10. An engagement surface 50 of the flanges 48 may be of inclined or otherwise of non-uniform height relative to the remainder of the inner surface 46. A less raised or lower portion 52 of the engagement surface 50 may facilitate initial rotation of the head 44 relative to the track 12 and a more raised or higher portion 54 of the engagement surface 50 may provide greater retention force on the track 12 when the fastener assembly 24 is secured. The engagement surfaces 50 may be mirror images and symmetrical so they interact with the track similarly as the bolt 38 is rotated.

To permit the fastener assembly 24 to be coupled to cleat body 22, the shank 42 is adapted to extend through the opening 36 in the cleat body 22 base wall 34 so that the head 44 is on one side of the base wall 34 and a free end 56 of the shank 42 is exposed on the other side of the base wall 34. The shank 42 may include retention features at or near the free end 56 that receive the second retainer which in the example shown include threads 58 for the nut 40. The threads 58 are exposed within the cavity 30 when the shank 42 is positioned through the base wall 34 so that the nut 40 may be threaded onto the shank 42 to capture the base wall 34 between the nut 40 and head 44. The shank 42 may be generally cylindrical and include one or more stop surfaces 60 defined on one or more lobes 62. In the example shown, the shank 42 includes two lobes 62, each having one stop surface 60, and each lobe 62 extends axially along the shank 42 and radially outwardly from a main portion of the shank 42. The lobes 62 and stop surfaces 60, in the illustrated example, are diametrically opposed and symmetrical. Although other shapes and arrangements may be used, as desired, including only one stop surface (and hence, one lobe) as noted above. The stop surfaces 60 are adapted to engage a corresponding stop surface 64 of the cleat body 22 to limit rotation of the bolt 38 relative to the cleat body 22.

Figure 8:
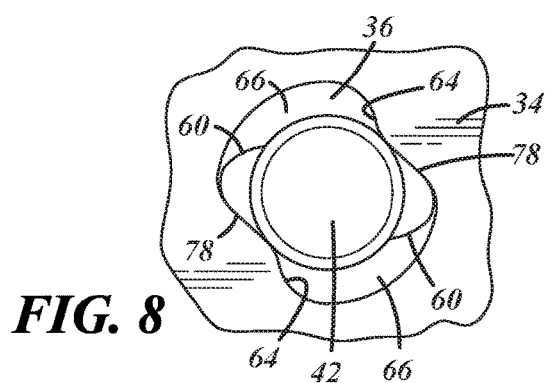
FIG. 8 is a fragmentary sectional view showing a shank of the fastener assembly within a bore of the cleat body when the fastener assembly is in the first position.
Figure 9:
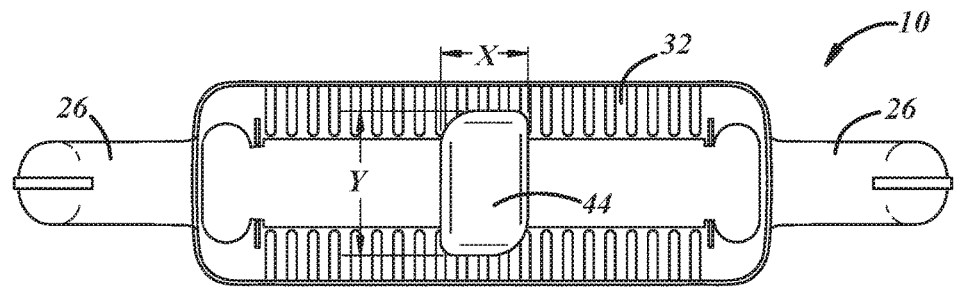
FIG. 9 is a bottom view of the cleat showing the fastener assembly in a second position with a retainer head generally perpendicular to the cleat body.

In the example shown, the stop surfaces 64 (FIGS. 8, 10 and 12) of the cleat body 22 are arranged within the base wall opening 36 which is not circular in cross-section. The stop surfaces 64 could be carried elsewhere on the cleat body 22, outside of the opening 36, if desired. Instead of being circular, the opening 36 includes larger portions 66 and inwardly extending portions that define the stop surfaces 64. The lobes 62 are received in the larger portions 66 which permit rotation of the shank 42 and lobes 62 relative to the cleat body 22 until the stop surfaces 60 of the lobes 62 engage the stop surfaces 64 of the cleat body 22 at which point further rotation is prevented. The opening 36 is oriented so that the shank 42 may rotate at least forty-five (45) degrees and up to about one hundred and thirty-five (135) degrees to permit like rotation of the head 44 relative to the track 12. In at least some implementations, the opening 36 and bolt 38 are arranged to permit rotation of the shank 42 a nominal ninety (90) degrees (+/− ten (10) degrees) relative to the cleat body 22. This permits the bolt 38 to be in a first position with the length Y of the head 44 generally parallel to the track slot 18, as shown in FIG. 7, and then to be rotated to a second or installed position with the length Y of the head 44 generally perpendicular to the track slot 18 as shown in FIG. 9.

The nut 40 may be standard and a have a non-circular periphery 70 providing drive surfaces to facilitate tightening the nut 40 as is known. A thumb wheel 72 may be installed onto the nut 40 to provide a larger diameter for increased torque to facilitate firm manual tightening of the nut 40 and fastener assembly 24. As shown in FIG. 3, the thumb wheel 72 may be a separate component from the nut 40, which is snap-fit or otherwise secured to the nut 40 to inhibit or prevent their subsequent separation. In assembly, as shown in FIG. 3, the bolt 38 may be positioned through the opening 36, and the nut 40 (with an optional washer) may be installed onto the bolt 38 with at least some threads 58 exposed from the nut 40. One or more threads 58 may then be deformed or crimped before the thumb wheel 72 is installed onto the nut 40 (in this example, the thumb wheel 72 includes a cavity in which the nut 40 is received, with the thumb wheel 72 snap fit onto the periphery of the nut 40). The deformed thread(s) will inhibit removal of the nut 40 from the bolt 38 while permitting sufficient rotation of the nut 40 so that the fastener assembly 24 may be fully loosened and tightened in use. This maintains the fastener assembly 24 and the cleat body 22 together as a unit to prevent parts from being separated or lost, and is optional and intended for the convenience of the user.

Figure 10:
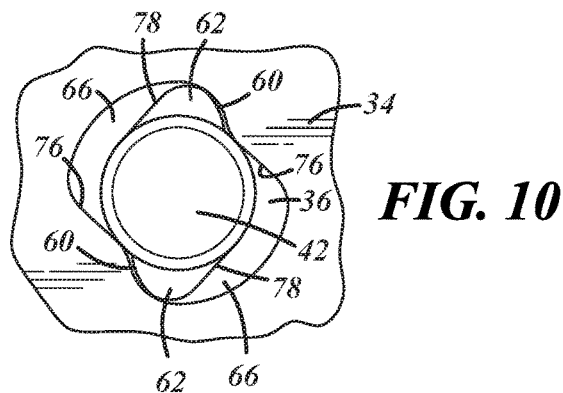
FIG. 10 is a fragmentary sectional view showing a shank of the fastener assembly within the bore of the cleat body when the fastener assembly is in the second position.

In use, the cleat 10 may be installed with the length L of the cleat body 22 parallel to the track 12 and track slot 18. So that the head 44 can be received into the track 12 cavity through the track slot 18, the head 44 of the retainer is positioned with its length Y parallel to the track slot 18, as shown in FIG. 7. In this position, the shank 42 is positioned in the opening 36 as shown in FIG. 8. The nut 40 should be loose or backed off relative to the head 44 so that the fastener assembly 24 is relatively loosely carried by the cleat body 22 and the head 44 may be separated from the bottom surface 32 to receive the track walls 20 between the head 44 and bottom surface 32. To secure the cleat 10 to the track 12, the thumb wheel 72 is rotated clockwise (in this example) to tighten the nut 40 and the nut 40 advances down the shank 42 toward the head 44. During this rotation, friction between the nut 40 and threads will rotate the bolt 38 within the opening 36 until the bolt stop surfaces 60 engage the cleat body stop surfaces 64. Further tightening of the bolt 38 will tend to rotate the bolt 38 further, but such rotation is prevented by the engaged stop surfaces 60, 64, as shown in FIG. 10. In this position, the head 44 is oriented so that the length Y of the head 44 is perpendicular to the track slot 18, providing maximum overlap of the head 44 and track walls 20. When the nut 40 is finally tightened, the head 44 is securely engaged with the track walls 20 and the track walls 20 are securely trapped between the head 44 and cleat body 22 and the cleat 10 is thereby firmly connected to the track 12.

The opposite action occurs upon loosening the nut 40 to remove the cleat 10 from the track 12, or permit movement of the cleat 10 along the track 12 to secure the cleat 10 in a different location. To loosen the nut 40, the thumb wheel 72 is rotated counterclockwise so that the nut 40 moves away from the head 44. Friction between the nut 40 and threads tends to rotate the bolt 38 counterclockwise within the opening 36 from the position shown in FIG. 9 to the position shown in FIG. 7 so that the length Y of the head 44 is parallel to and aligned with the track slot 18. To prevent over-rotation of the bolt 38 which would misalign the head 44 with the track slot 18 and prevent its easy removal through the track slot 18, the body 22 may also include limit surfaces 76 (FIGS. 8, 10 and 12). The limit surfaces 76 may also be provided within the opening 36, if desired, and may be defined by or on different surfaces of the inwardly extending portions that define the stop surfaces 64. In this implementation, the limit surfaces 76 are arranged in the opening 36 to engage corresponding limit surfaces 78 on the lobes 62 in similar manner to the stop surfaces 64 but when the head 44 is aligned with the slot. Hence, the limit surfaces 76, 78 and stop surfaces 60, 64 control the amount of rotation that is permitted between the bolt 38 and cleat body 22 to control the orientation of the head 44 in a desired manner. In at least some implementations, two limit surfaces may be provided, and arranged generally diametrically opposed from each other, on both the cleat body 22 and the bolt 38. Further, the limit surface(s) 76 of the cleat body 22 is angularly offset from the stop surface 64 of the cleat body 22 by between 80 and 100 degrees, and the same is true of the limit surface 78 and stop surface 60 of the bolt. This permits rotation of the bolt relative to the cleat body by between 80 and 100 degrees, as noted above.

Thus, the head 44 is automatically rotated during installation of the cleat 10 and removal of the cleat to facilitate use of the cleat. The automatic rotation of the bolt 38 also permits the cleat body 22 to be installed parallel to the track 12 whereas prior cleat bodies were required to be initially oriented perpendicular to the track 12 and then the entire cleat body 22 rotated to an orientation parallel to the track 12 to misalign their fastener assembly with the track 12 before tightening the fastener assembly. In certain areas of the track 12, objects, which may include components of the vehicle, may interfere with or prevent positioning the cleat body 22 perpendicular to the track 12. Or to do so, the cleat body 22 may have to be undesirably small. This is represented in FIG. 6 where the arcuate line 80 illustrates an object near the track 12 that prevents the cleat body 22 from being oriented perpendicular to the track 12. The object may be a door to a storage compartment in the vehicle cargo area, a user installed aftermarket cargo feature (e.g. a lockbox or the like), or anything else. Installation of the cleat body 22 parallel to the track 12 permits use of the cleat 10 in areas with limited clearance or open space near the track 12 and increases the utility of the cleat 10 and vehicle storage area.

FIGS. 13 and 14 illustrate alternate bolt and base wall opening configurations to achieve the rotation limits noted above and facilitate automatic rotation of the bolt as noted above. In FIG. 13, the cleat body 22a includes one stop surface 64a and one limit surface 76a at a ninety (90) degree angle to the stop surface 64a. The bolt 38a includes a flat surface a portion of which defines a stop surface 60a that engages the stop surface 64a when rotated clockwise and another portion of which defines a limit surface 78a that engages the limit surface 76a when rotated counterclockwise. In FIG. 14, the cleat body 22b includes one stop surface 64b and one limit surface 76b. The bolt 38b includes a stop surface 60b and a limit surface 78b at a ninety (90) degree angle to the stop surface 60b. The bolt stop surface 60b engages the body stop surface 64b when the bolt 38 is rotated clockwise and the bolt limit surface 78b engages the body limit surface 76b when the bolt 38b is rotated counterclockwise. These are just a couple examples of alternate configurations of the bolt 38 and opening 36, other configurations may be used.

Also, instead of or in addition to the automatic bolt 38 rotation noted above, the bolt 38 may be positively rotated into position independently of nut 40 rotation, if desired. This may be accomplished in numerous ways, one of which is to provide a rotation element 90 fixed to the bolt 38 or with no or limited relative rotation permitted between the rotation element 90 and the bolt 38. FIG. 15 illustrates one example of a rotation element 90 implemented as a flat washer positioned between the base wall 34 and nut 40. The washer 90 has a non-circular opening 92 (shown as generally D-shaped in this example) through which a complementarily shaped portion of the shank 42 extends so that no or only limited rotation is permitted between the bolt 38 and washer 90. The washer 90 includes extensions 94 that extend radially outwardly beyond the thumb wheel 72 so that they may be manually engaged by a user to rotate the washer 90, and hence, the fastener assembly 24. After positioning the cleat body 22 over the track 12, with the head 44 received through the track slot 18, a user may rotate the washer 90 to rotate the bolt 38 relative to the track 12 and thereby ensure that the head 44 is properly oriented relative to the track 12 for secure connection of the cleat 10 to the track 12. Instead, the extensions 94 may merely provide a visual indication of the bolt 38 orientation so that desired rotation and orientation of the bolt 38 may be verified during installation of the cleat 10.

Further, a spring or other biasing member 96 may be coupled to the washer 90 (and perhaps to the cleat body 22 as diagrammatically shown) to assist or drive rotation of the washer 90 and fastener assembly 24 as desired. In one form, the spring 96 may bias the fastener assembly 24 into or toward the position shown in FIG. 9. To install the cleat 10 including such a biasing member 96, the washer 90 may be manually rotated against the biasing force to align the head 44 with the track slot 18, and after the head 44 is received through the track slot 18, the washer 90 may be released. The biasing force may be sufficient to rotate the head 44 to the position shown in FIG. 9, or it may simply assist the rotation that tends to occur upon tightening of the nut 40, as set forth above. Of course, other rotation elements with or without biasing members may be used and the above are just a few of many possibilities. While the forms of the invention herein disclosed constitute presently preferred embodiments, many others are possible. It is not intended herein to mention all the possible equivalent forms or ramifications of the invention. For example, while the limit and stop surfaces of the cleat body are shown within the opening, these surfaces could be provided elsewhere on the body where they may be engaged upon rotation of the bolt. It is understood that the terms used herein are merely descriptive, rather than limiting, and that various changes may be made without departing from the spirit or scope of the invention. For example, relative location or orientation terms like upper, lower, side, top, bottom, left, right or the like are directed to the orientation of components in the drawings and are not intended to limit the invention unless expressly noted as such a limitation. It is contemplated that the components may be oriented and arranged in other ways.

The invention claimed is:

1. A tie-down cleat, comprising:
   a body having at least one stop surface and a wall with an opening; and
   a fastener assembly having a first retainer extending through the opening and having a head, and a second retainer operable to actuate the first retainer, the first retainer being rotatable relative to the body and including a stop surface oriented to selectively engage the stop surface of the body to limit rotation of the first retainer relative to the body.

2. The cleat of claim 1 wherein the stop surfaces are arranged so that the first retainer can rotate at least eighty (80) degrees relative to the body.

3. The cleat of claim 1 wherein the body has a length and a width that is less than the length, and the first retainer has a head that has a length and a width that is less than the length of the head, and wherein the stop surface of the first retainer engages the stop surface of the body when the head is oriented so that the length of the head is perpendicular to the length of the body or rotated within ten (10) degrees of being perpendicular.

4. The cleat of claim 1 wherein the body includes a limit surface and the first retainer includes a limit surface adapted to engage the limit surface of the body to limit rotation of the first retainer relative to the body.

5. The cleat of claim 4 wherein the stop surface of the first retainer engages the stop surface of the body when the first retainer is rotated in a first direction and the limit surface of the first retainer engages the limit surface of the body when the first retainer is rotated in a second direction.

6. The cleat of claim 1 which also includes a rotation element that is coupled to the first retainer for rotation therewith.

7. The cleat of claim 6 which includes a biasing member coupled to the rotation element to yieldably bias the rotation element for rotation in one direction.

8. The cleat of claim 1 wherein the second retainer is frictionally engaged with the first retainer so that rotation of the second retainer tends to cause rotation of the second retainer.

9. The cleat of claim 4 wherein the body has a length and a width that is less than the length, and the first retainer has a head that has a length and a width that is less than the length of the head, and wherein the length of the head is parallel to the length of the body when the limit surface of the first retainer and the limit surface of the body are engaged.

10. The cleat of claim 1 wherein the first retainer includes a lobe that extends radially outwardly from an adjacent portion of the first retainer, and the lobe defines at least part of the stop surface of the first retainer.

11. The cleat of claim 1 wherein the stop surface of the body is defined at least partially within the opening.

12. The cleat of claim 4 wherein the limit surface of the body is defined at least partially within the opening.

13. The cleat of claim 4 wherein the limit surface of the body is angularly offset from the stop surface of the body by between 80 and 100 degrees.

14. The cleat of claim 11 wherein the body includes an inwardly extending portion that protrudes into the opening and defines a non-circular portion of the opening, and the stop surface is defined by the inwardly extending portion.

15. The cleat of claim 8 wherein the frictional engagement is a threaded arrangement between the first retainer and second retainer.

16. The cleat of claim 1 wherein the body includes two stop surfaces that are diametrically opposed.

17. The cleat of claim 4 wherein the body includes two limit surfaces that are diametrically opposed.

18. A tie-down cleat, comprising:
    a body having at least one stop surface and an opening formed in the body, the opening extending from a first side to a second side; and
    a fastener assembly having a first retainer having a shank extending through the opening and having a head received adjacent to the first side of the opening, and a second retainer coupled to the first retainer adjacent to the second side of the opening, the first retainer being rotatable relative to the body and including a stop surface oriented to selectively engage the stop surface of the body at a location of the first retainer that is spaced from the head to limit rotation of the first retainer relative to the body.

19. The cleat of claim 18 wherein the stop surface of the body is defined at least partially within the opening.

20. The cleat of claim 19 wherein the opening is not circular in cross-section.

* * * * *